US012626376B2

(12) United States Patent
Kim et al.

(10) Patent No.: US 12,626,376 B2
(45) Date of Patent: May 12, 2026

(54) APPARATUS AND METHOD WITH IMAGE MATCHING

(71) Applicants:SAMSUNG ELECTRONICS CO., LTD., Suwon-si (KR); POSTECH Research and Business Development Foundation, Pohang-si (KR)

(72) Inventors: Seung Wook Kim, Pohang-si (KR); Minsu Cho, Pohang-si (KR); Juhong Min, Pohang-si (KR)

(73) Assignees: Samsung Electronics Co., Ltd., Suwon-si (KR); POSTECH Research and Business Development Foundation, Pohang-si (KR)

( * ) Notice: Subject to any disclaimer, the term of this patent is extended or adjusted under 35 U.S.C. 154(b) by 366 days.

(21) Appl. No.: 18/316,347

(22) Filed: May 12, 2023

(65) Prior Publication Data

US 2024/0161455 A1 May 16, 2024

(30) Foreign Application Priority Data

Nov. 11, 2022 (KR) ........................ 10-2022-0150904

(51) Int. Cl.
| | |
|---|---|
| *G06T 7/33* | (2017.01) |
| *G06V 10/74* | (2022.01) |
| *G06V 10/75* | (2022.01) |
| *G06V 10/82* | (2022.01) |

(52) U.S. Cl.
CPC .............. *G06T 7/33* (2017.01); *G06V 10/757* (2022.01); *G06V 10/761* (2022.01); *G06V 10/82* (2022.01)

(58) Field of Classification Search
CPC ...... G06T 7/33; G06V 10/757; G06V 10/761; G06V 10/82
See application file for complete search history.

(56) References Cited

U.S. PATENT DOCUMENTS

| | | | |
|---|---|---|---|
| 2006/0204040 A1* | 9/2006 | Freeman ................. | G06T 7/246 |
| | | | 382/218 |
| 2019/0347826 A1* | 11/2019 | Zhang ...................... | G06N 3/08 |
| 2021/0241479 A1* | 8/2021 | Jie ........................... | G06T 7/593 |
| 2021/0374911 A1* | 12/2021 | Kudo ..................... | G06N 3/045 |

FOREIGN PATENT DOCUMENTS

| | | |
|---|---|---|
| CN | 112308137 A | 2/2021 |
| CN | 112489098 A | 3/2021 |
| CN | 112949765 A | 6/2021 |

(Continued)

OTHER PUBLICATIONS

Vaswani et al., "Attention is All You Need" (published at https://arxiv.org/abs/1706.03762v5, Dec. 2017).*

(Continued)

*Primary Examiner* — Casey L Kretzer
(74) *Attorney, Agent, or Firm* — NSIP Law

(57) ABSTRACT

A processor-implemented method includes: extracting feature maps respectively corresponding to a plurality of channels based on a convolutional network with respect to two images; generating a matching point map from the feature maps; refining the matching point map by using attention between matching points comprised in the matching point map; and extracting a matching point between the two images from the refined matching point map.

25 Claims, 7 Drawing Sheets

(56)                References Cited

FOREIGN PATENT DOCUMENTS

| CN | 114511602 A | 5/2022 |
| KR | 10-1991-0023101 A | 12/1991 |
| KR | 10-0247969 B1 | 3/2000 |

OTHER PUBLICATIONS

Shen et al, "End-to-End Deep Kronecker-Product Matching for Person Re-identification" (published in 2018 IEEE/CVF Conference on Computer Vision and Pattern Recognition, pp. 6886-6895, Jun. 2018).*

Kim, Seungwook, et al. "TransforMatcher: Match-to-Match Attention for Semantic Correspondence." *Proceedings of the IEEE/CVF Conference on Computer Vision and Pattern Recognition.* (2022). pp. 8697-8707.

Cho, Seokju, et al. "Cats: Cost aggregation transformers for visual correspondence." *Advances in Neural Information Processing Systems* vol. 34 (2021). pp. 1-13.

Min, Juhong, et al. "Convolutional hough matching networks." *Proceedings of the IEEE/CVF Conference on Computer Vision and Pattern Recognition.* (2021). pp. 2940-2950.

Rocco, Ignacio, et al. "Efficient neighbourhood consensus networks via submanifold sparse convolutions." *Computer Vision—ECCV 2020: 16th European Conference, Glasgow, UK, Aug. 23-28, 2020, Proceedings, Part IX 16.* Springer International Publishing, (2020). pp. 1-17.

Min, Juhong, et al. "Learning to compose hypercolumns for visual correspondence." *Computer Vision—ECCV 2020: 16th European Conference, Glasgow, UK, Aug. 23-28, 2020, Proceedings, Part XV 16.* Springer International Publishing, (2020). pp. 1-18.

Sun, Jiaming, et al. "LoFTR: Detector-free local feature matching with transformers." *Proceedings of the IEEE/CVF conference on computer vision and pattern recognition.* (2021). pp. 8922-8931.

Rocco, Ignacio, et al. "Neighbourhood consensus networks." *Advances in neural information processing systems* vol. 31 (2018). pp. 1-12.

Sarlin, Paul-Edouard, et al. "Superglue: Learning feature matching with graph neural networks." *Proceedings of the IEEE/CVF conference on computer vision and pattern recognition.* (2020). pp. 4938-4947.

* cited by examiner

: A feature match

: An element to transform

: A set of elements attended

Start

Extract feature maps respectively from two images ⟞⟍210

Generate matching point map from feature maps ⟞⟍220

Refine matching point map by using attention between matching points included in matching point map ⟞⟍230

Extract matching point between two images from refined matching point map ⟞⟍240

End

APPARATUS AND METHOD WITH IMAGE MATCHING

CROSS-REFERENCE TO RELATED APPLICATIONS

This application claims the benefit under 35 USC § 119(a) of Korean Patent Application No. 10-2022-0150904, filed on Nov. 11, 2022 in the Korean Intellectual Property Office, the entire disclosure of which is incorporated herein by reference for all purposes.

BACKGROUND

1. Field

The following description relates to an apparatus and method with image matching.

2. Description of Related Art

Image matching technology may identify matching parts of two images. When the two images capture the same scene or the same object in different conditions (e.g., illuminance, an angle, etc.), the technology may be referred to as wide-baseline matching. When the two images capture different instances of an object in the same class, the technology may be referred to as semantic matching.

A cosine similarity of extracted features may be basically used to find matching points of the two images. The image matching technology aims to obtain a high cosine similarity between matching points and obtain a low cosine similarity between unmatched points. Accordingly, a trained convolutional neural network (CNN) in an ImageNet dataset may be used to extract the features of an image in an image matching field.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a processor-implemented method includes: extracting feature maps respectively corresponding to a plurality of channels based on a convolutional network with respect to two images; generating a matching point map from the feature maps; refining the matching point map by using attention between matching points comprised in the matching point map; and extracting a matching point between the two images from the refined matching point map.

The refining the matching point map may include refining the matching point map through an attention structure based on addition between layers comprised in a transformer neural network.

The refining the matching point map through the attention structure based on the addition between the layers comprised in the transformer neural network may include: determining a first global vector of one dimension from a query layer; determining a first relation layer for all key vectors of a key layer by performing addition-based attention on the first global vector and all the key vectors of the key layer; determining a second global vector of one dimension from an intermediate layer; and determining a second relation layer for all value vectors of a value layer by performing addition-based attention on the second global vector and all the value vectors of the value layer.

The method may include performing addition of all query vectors of the query layer and all vectors of the second relation layer.

The generating the matching point map may include generating the matching point map of four dimension for the feature maps by using the feature maps of two dimension.

The refining the matching point map may include: converting the matching point map to a vector of one dimension; and calculating a similarity by performing attention on the matching points.

The refining the matching point map may include increasing a size of the refined matching point map by upsampling the refined matching point map.

The extracting the feature maps may include extracting the feature maps corresponding to a result of a bottleneck layer of the convolutional network.

The extracting the matching point may include extracting the matching point between the two images by calculating a dense flow field by using the refined matching point map.

The method may include training a transformer neural network used for the refining of the matching point map by using a loss function for the extracted matching point and a labeled matching point between the two images.

In one or more general aspects, a non-transitory computer-readable storage medium stores instructions that, when executed by a processor, configure the processor to perform any one, any combination, or all of operations and/or methods described herein.

In one or more general aspects, a processor-implemented method includes: extracting feature maps respectively corresponding to a plurality of channels based on a convolutional network with respect to two training images; generating a matching point map from the feature maps; refining the matching point map through an attention structure based on addition between layers comprised in a transformer neural network; extracting a matching point between the two training images from the refined matching point map; and training the transformer neural network for refining the matching point map by using a loss function for the extracted matching point and a labeled matching point between the two training images.

The refining the matching point map through the attention structure based on the addition between the layers comprised in the transformer neural network may include: determining a first global vector of one dimension from a query layer; determining a first relation layer for all key vectors of a key layer by performing addition-based attention on the first global vector and all the key vectors of the key layer; determining a second global vector of one dimension from an intermediate layer; and determining a second relation layer for all value vectors of a value layer by performing addition-based attention on the second global vector and all the value vectors of the value layer.

The method may include performing addition of all query vectors of the query layer and all vectors of the second relation layer.

The generating the matching point map from the feature maps may include generating the matching point map of four dimension for the feature maps by using the feature maps of two dimension.

The refining the matching point map by using the attention between the matching points comprised in the matching point map further may include: converting the matching point map to a vector of one dimension; and calculating a similarity by performing attention on the matching points.

In one or more general aspects, an apparatus includes: one or more processors configured to: extract feature maps respectively corresponding to a plurality of channels based on a convolutional network with respect to the two training images; generate a matching point map from the feature maps; refine the matching point map by using attention between matching points comprised in the matching point map; and extract the matching point between the two images from the refined matching point map.

For the refining the matching point, the one or more processors may be configured to refine the matching point map through an attention structure based on addition between layers comprised in a transformer neural network.

For the refining the matching point map through the attention structure based on the addition between the layers comprised in the transformer neural network, the one or more processors may be configured to: determine a first global vector of one dimension from a query layer; determine a first relation layer for all key vectors of a key layer by performing addition-based attention on the first global vector and all the key vectors of the key layer; determine a second global vector of one dimension from an intermediate layer; and determine a second relation layer for all value vectors of a value layer by performing addition-based attention on the second global vector and all the value vectors of the value layer.

The one or more processors may be configured to perform addition of all query vectors of the query layer and all vectors of the second relation layer.

For the generating the matching point map, the one or more processors may be configured to generate the matching point map of four dimension for the feature maps by using the feature maps of two dimension.

For the refining the matching point map, the one or more processors may be configured to: convert the matching point map to a vector of one dimension; and calculate a similarity by performing attention on the matching points.

For the refining the matching point map, the one or more processors may be configured to increase a size of the refined matching point map by upsampling the refined matching point map.

For the extracting the feature maps, the one or more processors may be configured to extract the feature maps corresponding to a result of a bottleneck layer of the convolutional network.

For the extracting the matching point, the one or more processors may be configured to extract the matching point between the two images by calculating a dense flow field by using the refined matching point map.

Other features and aspects will be apparent from the following detailed description, the drawings, and the claims.

4

Figure 6:
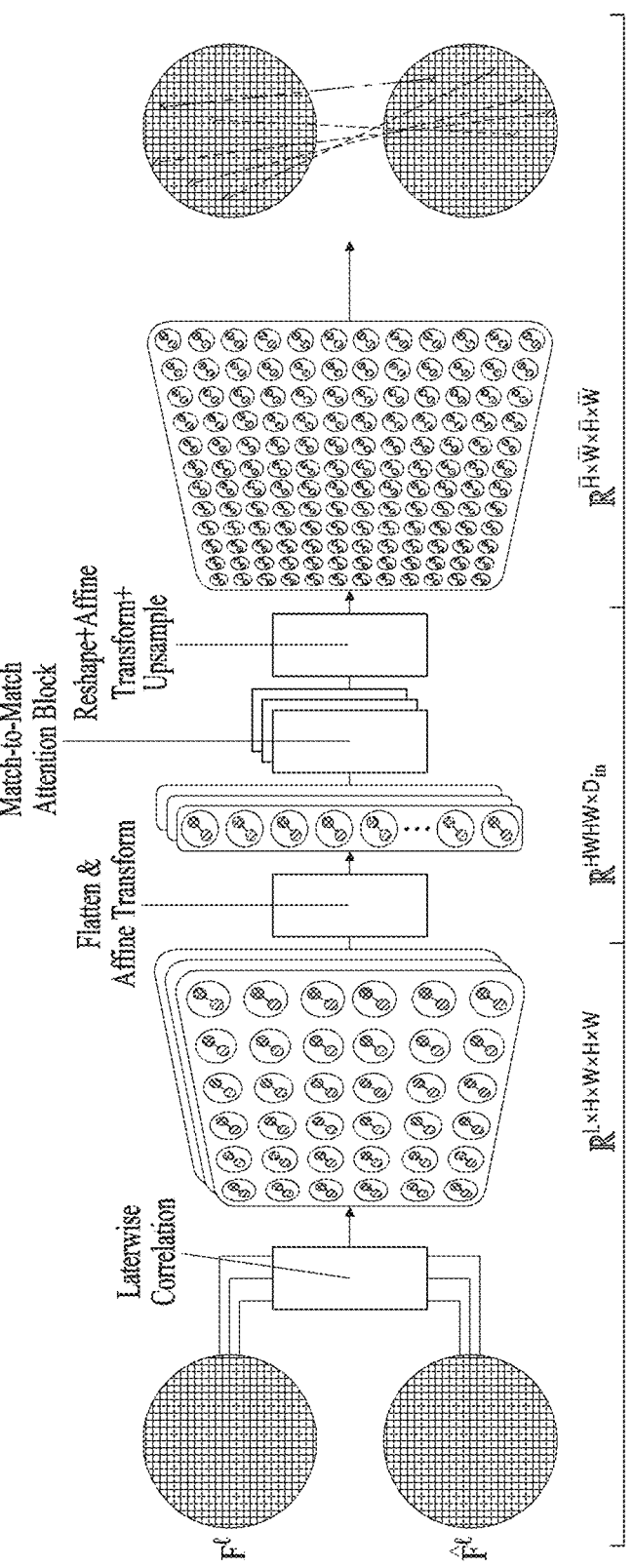

FIG. 6 illustrates an example of a process of finding a matching point between two images.

Figure 7A:
Figure 7B:
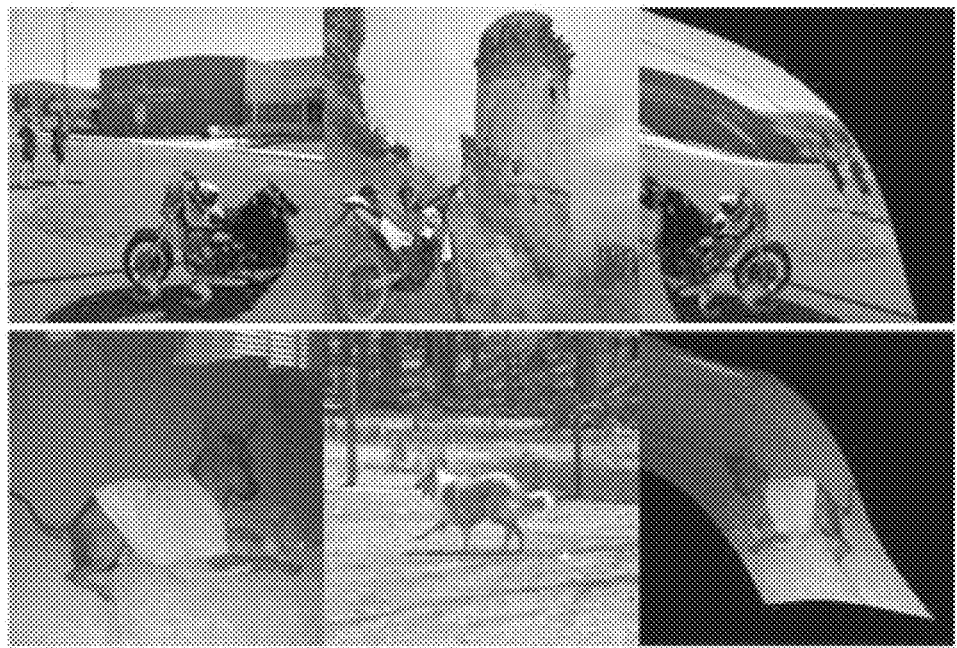

FIGS. 7A and 7B illustrate examples of using a result of finding a matching point between two images.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

Figures 1A, 1B, 1C:
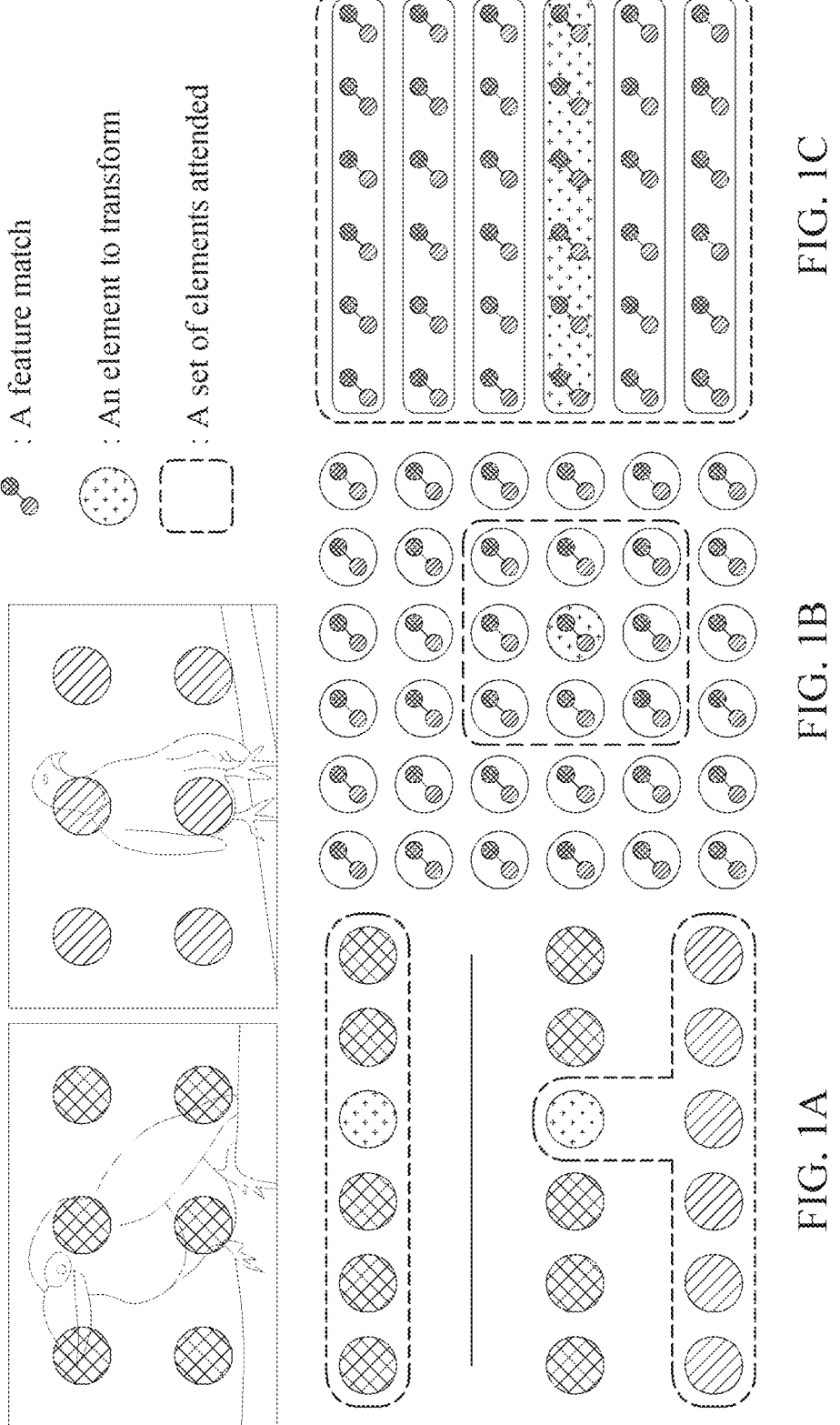
FIGS. 1A, 1B, and 1C illustrate examples of technology for image matching.

FIGS. 1A, 1B, and 1C are diagrams illustrating technology for image matching.

FIG. 1A illustrates a method of selectively determining from which layer of a convolutional neural network used for feature extraction a feature is extracted. The method may identify the feature for image matching.

FIG. 1B illustrates a method of calculating a cosine similarity after converting the features of two images by repeatedly performing attention between the features of the two images, that is, the self-attention and cross-attention of the features, into image features more suitable for image matching when the features of the two images are provided.

FIG. 1C illustrates a method of refining a cosine similarity score by considering the periphery of a four-dimensional (4D) similarity space (2D×2D features) after calculating a cosine similarity of all matching points possible between features extracted from two images. In this case, a high-dimensional convolutional neural network may be used to consider the periphery.

Figure 2:
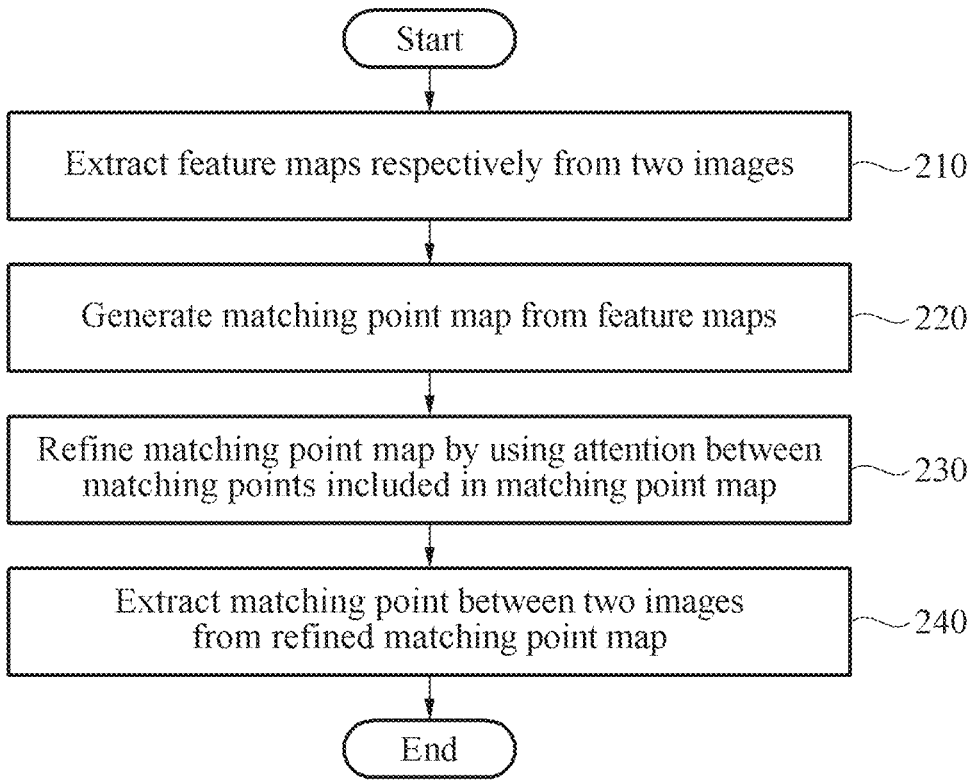
FIG. 2 illustrates an example of an operating method of an apparatus for finding a matching point between two images.

FIG. 2 illustrates an example of an operating method of an apparatus for finding a matching point between two images.

In operation 210, the apparatus may extract feature maps respectively corresponding to a plurality of channels based on a convolutional network with respect to the two images.

To extract the feature maps, features may be extracted by using a neural network pretrained using, and stored in, an image recognition dataset (e.g., ImageNet). In this case, a result feature map of a bottleneck layer may be extracted for some convolutional neural network blocks included in the neural network.

In operation 220, the apparatus may generate a matching point map from the feature maps.

The apparatus may generate the matching point map by using the feature maps, being two-dimensional (2D) feature maps, extracted from the two images and may generate a 4D matching point map by using the 2D feature maps.

When two images $I, \hat{I} \in \mathbb{R}^{H \times W \times C}$ are respectively input, extracted feature maps may be represented by $\{(F^l, \hat{F}^l)\}_{i=1}^{L}$. The 2D feature maps respectively extracted from bottleneck layers of the same depth may be used to generate a matching point map through Equation 1 below, for example.

$$C_{x,\hat{x}}^l = ReLU\left(\frac{F_{x,:}^l \cdot \hat{F}_{\hat{x},:}^l}{\|F_{x,:}^l\| \|\hat{F}_{\hat{x},:}^l\|}\right) \qquad \text{Equation 1}$$

Here, C' denotes the matching point map and x and $\hat{X}$ denote positions on the 2D feature maps. A multichannel (the number of channels=L) matching point map may be generated by stacking L matching point maps. The multichannel matching point map may be generated such that a plurality of channels is may be used to use all matching points of a matching point map as an input of an attention mechanism. In addition, the use of feature maps obtained from bottleneck layers of different depths may further diversify meanings and patterns In operation 230, the apparatus may refine the matching point map by using attention between matching points included in the matching point map.

A transformer neural network including a plurality of layers may be used to extract matching points by refining the matching point map. To use the attention between the matching points included in the matching point map, the apparatus may convert the matching point map currently in a 4D form into an 1D vector. Then, to perform attention by applying affine transformation to a channel axis of the matching point map stretched out in 1D, the matching point map may be respectively converted into a query Q layer, a key K layer, and a value V layer.

When converting the matching point map from 4D into 1D, a very long 1D vector may be generated. When applying the very long 1D vector to a typical attention mechanism, a calculation overhead may occur in a graphics processing unit (GPU).

Accordingly, the apparatus of one or more embodiments may include a structure of a neural network for performing addition-based attention, not multiplication-based attention.

Addition-based attention to express interactions of all key vectors with a global vector representing a query may be performed without encoding all interactions between the query and a key using Equation 2 below, for example. By avoiding the encoding of all the interactions, the apparatus of one or more embodiments may reduce overhead occurring in the GPU.

$$H_{i,:}^{(h)} = K_{i,:}^{(h)} \odot \sum_{j=1}^{T} Q_{j,:}^{(h)} \sigma\left(\tau w_q Q^{(h)T}\right)_j \qquad \text{Equation 2}$$

Here, H denotes a relation vector representing an inter-relation between all the key vectors of a key layer and the global vector of the query, and $w_q$ denotes a parameter for converting query vectors to the global vector. To obtain the global vector, dynamic addition may be performed on vectors included in a query layer. In other words, the global vector may be obtained through addition-based attention. According to Equation 2, an operation quantity may significantly decrease through the inner product between all the key vectors and the global vector of the query.

In addition, the global vector may be calculated for the relation vector H calculated in advance to calculate an interaction between the key layer and a value layer and a relation vector may be calculated by calculating an interaction of all value vectors of the value layer in the same method as Equation 2.

Then, a calculated result may be converted into a multi-layer perceptron and added to the query vector before calculated for the global vector of the query through residual connection.

Accordingly, addition-based attention of one or more embodiments between matching points may be implemented with a reasonable operation quantity and memory usage because the temporal complexity thereof is relatively low compared to the typical attention mechanism.

In operation 240, the apparatus may extract the matching point of the two images from the refined matching point map.

The apparatus may perform upsampling on the refined matching point map to increase the size of the refined matching point map again to the size of the 4D matching point map. Accordingly, the matching point map in a dimension that is significantly more suitable to be applied to an initially input image may be provided compared to the feature maps.

The apparatus may use a single-layer perceptron to convert the 4D matching point map into the matching point map of a single layer again, generate a dense flow field by applying a kernel soft argmax to the single-layer matching point map, and, based on the dense flow field, obtain information of a key point of a target image when a source image is provided. The apparatus may extract a semantic image matching result by using the obtained information.

Figure 3:
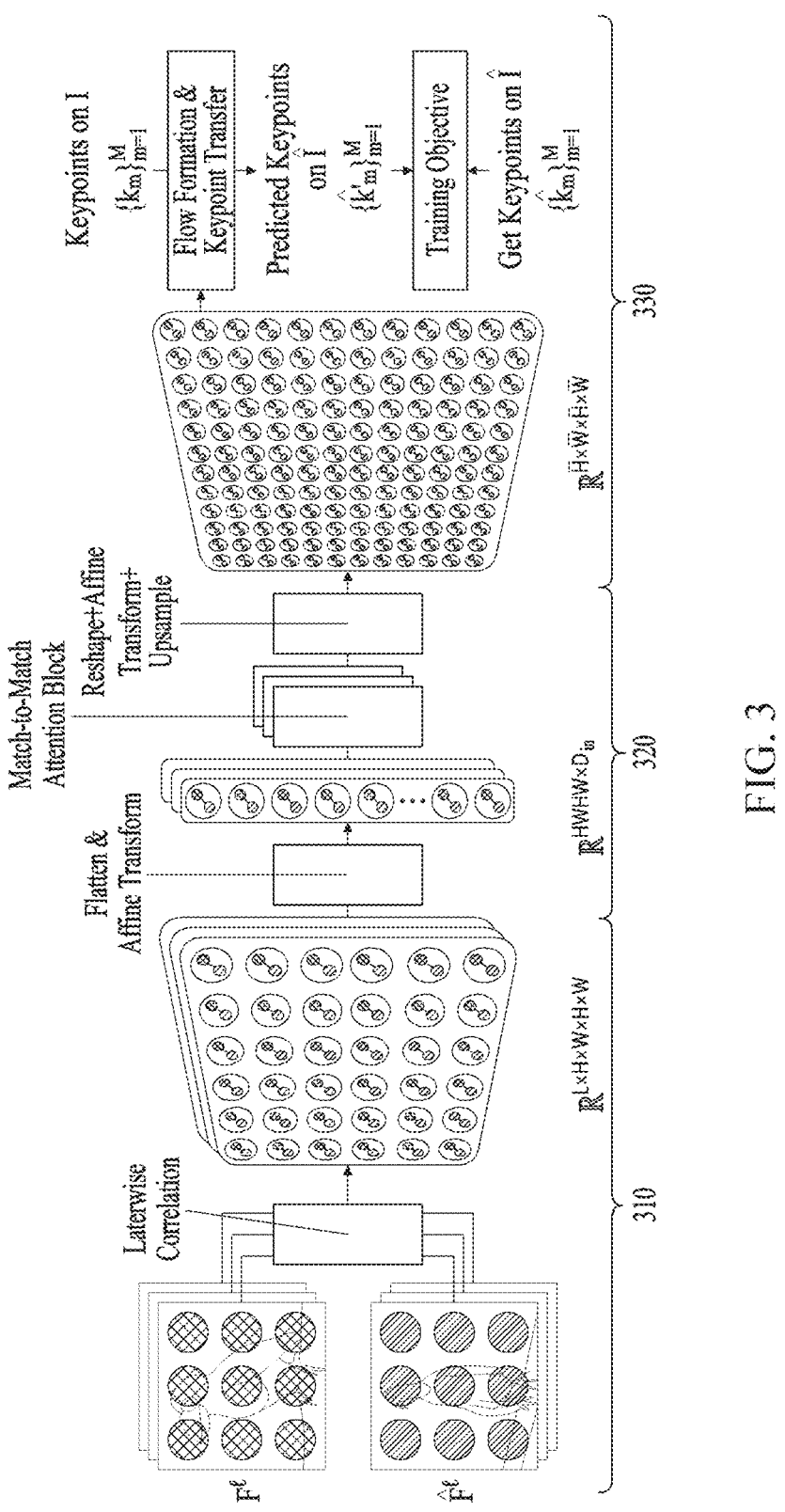
FIG. 3 illustrates an example of an operating method of an apparatus for finding a matching point between two images.

FIG. 3 illustrates an example of an operating method of an apparatus for finding a matching point between two images.

Referring to FIG. 3, operation 310 of extracting feature maps from the two images and generating a matching point map from the feature maps, operation 320 of refining the matching point map by using attention between matching points included in the matching point map, and operation 330 of extracting the matching point between the two images from the refined matching point map are sequentially illustrated.

The matching point map generated in operation 310 may be 4D, and when expressing the size of each of the two images as H×W, the matching point map may be ultimately represented by $C \in \mathbb{R}^{L \times H \times W \times H \times W}$.

In this case, a multilevel score for each candidate matching point may be provided unlike a single channel, that is, a correlation map having only a similarity score for each position pair between the two images which are a source image and a target image. In addition, a structure suitable to be an input to a transformer neural network structure may be proposed. A non-limiting example of the method of performing attention on the matching point map is described in detail below with reference to FIG. 4.

When performing addition-based attention between matching points through the transformer neural network structure, the apparatus may obtain the refined matching point map, generate a dense flow field based on the refined matching point map, and based on the dense flow field, obtain a matching point in the target image when a feature point in the source image is provided.

A matching point map $C_{out}$ refined through attention may be converted into a dense flow field with a kernel soft argmax applied thereto. An output may be normalized by using a softmax. The normalized output may be represented by Equation 3 below, for example.

$$C^{norm} = \frac{\exp\left(G_{kl}^{p} C_{ijkl}^{out}\right)}{\sum_{(k',l') \in \overline{H} \times \overline{W}} \exp\left(G_{k'l'}^{p} C_{ijk'l'}^{out}\right)} \qquad \text{Equation 3}$$

Here $G^p \in \mathbb{R}^{H \times W} G^p \in R^{\overline{H} \times \overline{W}}$ denotes a 2D Gaussian kernel, of which the center is p=arg $\max_{k,l} C_{i,j,k,l}^{out}$ p=arg $\max_{k,l} C_{i,j,k,l}^{out}$ for mitigating potentially irregular correlation values. A normalized matching point map $C^{norm}$ may encode a series of probability simplexes. The probability simplexes may transmit all coordinates in a dense regular grid $P \in R^{H \times W \times 2} P \in \mathbb{R}^{\overline{H} \times \overline{W} \times 2}$ in a source image to a target image and use all the coordinates to obtain coordinates corresponding to all the coordinates in the target image $\hat{I}:\hat{R}_{i,j}'= \Sigma_{(k,l) \in \overline{H} \times \overline{W}} C_{i,j,k,l}^{norm} P_{k,l}$ $\hat{I}:\hat{R}_{i,j}'=\Sigma_{(k,l) \in \overline{H} \times \overline{W}} C_{i,j,k,l}^{norm} P_{k,l}$.

Thereafter, a dense flow field may be configured in a subpixel level by using a set of estimated matching points.

Figure 4:
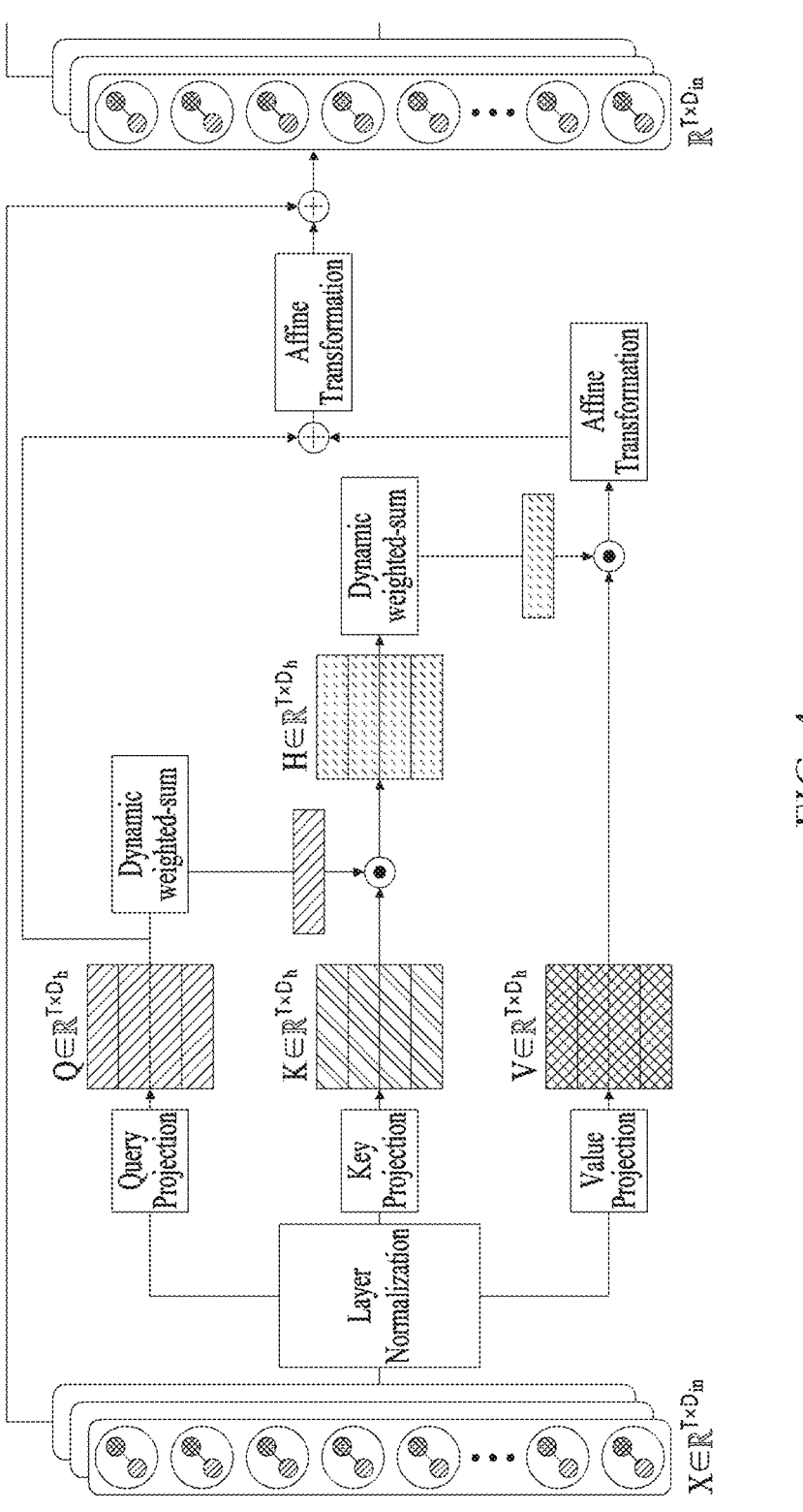
FIG. 4 illustrates an example of a transformer neural network structure for addition-based attention.

FIG. 4 illustrates an example of a transformer neural network structure for addition-based attention.

First, an apparatus may convert a matching point map from 4D to 2D such that the matching point map may operate as an input sequence. In this case, a match at each spatial position may be used as a notable factor. The 2D may be represented by $X=C^T W_{in}$ of the matching point map, in which C denotes a matching point map, $W_{in} \in \mathbb{R}^{L \times D_{in}}$ denotes a linear transformation matrix, and $X \in \mathbb{R}^{HW HW \times D_{in}}$ denotes an input to a subsequent attention block.

Because typical self-attention may cause a significant overhead in a transformer structure, the transformer structure of one or more embodiments may perform addition-based attention.

As described above, an intermediate layer expressing interactions of all key vectors with a global vector representing a query may be generated instead of encoding all possible interactions. The intermediate layer may be H in Equation 2.

In addition, to calculate interactions between a key and a value, the global vector may be obtained from the generated intermediate layer, and a layer expressing interactions with all value vectors may be generated. Then, the layer may be added to all query vectors. All the layers may include vectors of the same dimension, and such addition may be simply operated.

A refined matching point map of a single channel may be obtained by inputting a noisy 4D matching point map and calculating an interaction with the matching point map in the transformer structure. A vector may be divided into N vectors while converting the matching point map from 4D to 1D, and the process illustrated in FIG. 4 may be repeated N times.

A final output may be reconfigured as the 4D matching point map. The apparatus may perform 4D upsampling to configure the 4D matching point map and output a refined matching point map $C_{out}$.

In an example, a transformer-based neural network may be trained.

An apparatus for training a neural network may receive an input of a data set including training images to train the neural network. Each of the training images may include information of a key point which may be a matching point. The data set for training the neural network may include information of a preset matching point of two images, that is, a source image and a target image. For example, information on the number of matching points and the positions of the matching points may be included.

The apparatus may input the source image and the target image of the data set to train the neural network and predict a matching point between the two images. A ground truth coordinates pair image may be represented by $$\hat{I} : \{(k_m, \hat{k}'_m)\}_{m=1}^{M}.$$

$$\hat{I} : \{(k_m, \hat{k}'_m)\}_{m=1}^{M}$$

with respect to each of the training images. Here, M denotes the number of labeled matching points, $k_m$ denotes a matching point of the source image, and $$\hat{k}'_m : \hat{k}'_m$$

denotes a matching point of the target image.

The neural network may be trained based on a loss function between a predicted matching point for the target image through the neural network and a labeled (e.g., predetermined) matching point in the target image for the source image. The loss function may be represented by Equation 4 below, for example.

$$\mathcal{L} = \frac{1}{M} \sum_{m=1}^{M} \left\| \hat{k}_m - \hat{k}'^{i}_m \right\|_2^2.$$  Equation 4

According to Equation 4, a matching point, matching with each matching point of the source image, may be assigned to the target image, and the neural network may be trained to minimize an average Euclidean distance between a predicted result and ground truth.

10

Figure 5:
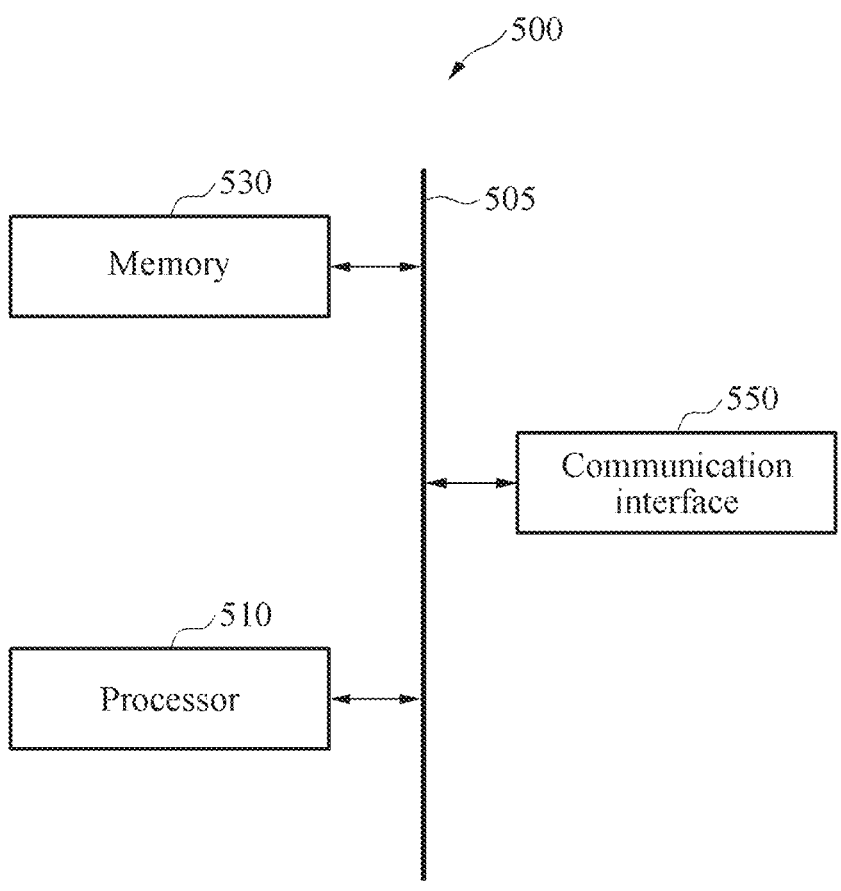
FIG. 5 illustrates an example of a structure of an apparatus for finding a matching point between two images.

FIG. 5 illustrates an example of a structure of an apparatus for finding a matching point between two images.

An apparatus 500 may include a memory 530, one or more processors 510, a communication interface 550, and one or more programs that are stored in the memory 530 and that are executed by the one or more processors 510. The memory 530, the one or more processors 510, and the communication interface 550 may communicate through a communication bus 505.

The one or more processors 510 may perform a method of finding the matching point between the two images through a pretrained neural network, and the apparatus 500 may obtain a result of finding the matching point between the two (input) images through the one or more programs. The one or more processors 510 may include a GPU (e.g., the GPU described above).

The one or more processors 510 may extract feature maps respectively corresponding to a plurality of channels based on a convolutional network with respect to the two images, generate a matching point map from the feature maps, refine the matching point map by using attention between matching points included in the matching point map, and extract the matching point between the two images from the refined matching point map.

The memory 530 may be a volatile memory or a nonvolatile memory, and the one or more processors 510 may execute the one or more programs and control the apparatus 500. The code of the one or more programs executed by the one or more processors 510 may be stored in the memory 530. For example, the memory 530 may include a nontransitory computer-readable storage medium storing instructions that, when executed by the one or more processors 510, configure the one or more processors 510 to perform any one, any combination, or all of the operations and methods described herein with reference to FIGS. 1A-7B. The apparatus 500 may be connected to an external device (e.g., a personal computer (PC) or a network) through an input/output device (not shown) to exchange data therewith. The apparatus 500 may be mounted on various computing devices and/or systems, such as a smartphone, a tablet computer, a laptop computer, a desktop computer, a television (TV), a wearable device, a security system, a smart home system, and the like.

FIG. 6 illustrates an example of a process of finding a matching point between two images.

A process of finding a matching point may be used to identify a defect, occurring in a manufacturing operation of various products, in a product. A defect of a manufactured product may be identified by inputting one of two images as a ground truth image of a normally manufactured product and inputting the other of the two images as an image of the manufactured product.

In the examples described herein, image matching is performed on an image of a semiconductor wafer. A matching point may be extracted by inputting an image of a normally manufactured wafer and an image of a manufactured wafer to be checked for a defect. Image matching may be performed on the two images by using a trained transformer-based neural network, and the image matching may be visualized.

Feature maps may be respectively extracted from the two images, a matching point map may be generated from the feature maps, and attention between matching points included in the matching point map may be used. The matching point map may be refined by performing attention based on the trained transformer-based neural network, and a matching point between the two images may be extracted from the refined matching point map.

When the image of the manufactured wafer has a defect, there may be an image section not matching with the image of the normally manufactured wafer. Whether the wafer has a defect may be visually verified in a section where the image matching is visualized.

FIGS. 7A and 7B illustrate examples of using a result of finding a matching point between two images.

FIG. 7A illustrates an example of changing a matching point included in a source image to the scale of a matching point of a target image.

A matching point predicted from the source image may be converted into an object corresponding to the matching point of the target image.

FIG. 7B illustrates an example of changing the matching point included in the source image to a viewpoint of the matching point of the target image. Matching points may be in a symmetrical form.

In an example, an accurate matching point may be found from a change in the feature of a class included in an image, including a scale or a viewpoint.

The apparatuses, processors, memories, communication interfaces, communication buses, apparatus 500, memory 530, one or more processors 510, communication interface 550, and communication bus 505, described herein and disclosed herein described with respect to FIGS. 1A-7B are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1A-7B that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method, the method comprising:
   extracting feature maps respectively corresponding to a plurality of channels based on a convolutional network with respect to two images;
   generating a matching point map from the feature maps;
   refining the matching point map by using attention between matching points comprised in the matching point map through an attention structure based on addition between layers comprised in a transformer neural network; and
   extracting a matching point between the two images from the refined matching point map.

2. The method of claim 1, wherein the refining the matching point map through the attention structure based on the addition between the layers comprised in the transformer neural network comprises:
   determining a first global vector of one dimension from a query layer;
   determining a first relation layer for all key vectors of a key layer by performing addition-based attention on the first global vector and all the key vectors of the key layer;
   determining a second global vector of one dimension from an intermediate layer; and determining a second relation layer for all value vectors of a value layer by performing addition-based attention on the second global vector and all the value vectors of the value layer.

3. The method of claim 2, further comprising performing addition of all query vectors of the query layer and all vectors of the second relation layer.

4. The method of claim 1, wherein the generating the matching point map comprises generating the matching point map of four dimension for the feature maps by using the feature maps of two dimension.

5. The method of claim 1, wherein the refining the matching point map comprises:
   converting the matching point map to a vector of one dimension; and
   calculating a similarity by performing attention on the matching points.

6. The method of claim 1, wherein the refining the matching point map comprises increasing a size of the refined matching point map by upsampling the refined matching point map.

7. The method of claim 1, wherein the extracting the feature maps comprises extracting the feature maps corresponding to a result of a bottleneck layer of the convolutional network.

8. The method of claim 1, wherein the extracting the matching point comprises extracting the matching point between the two images by calculating a dense flow field by using the refined matching point map.

9. The method of claim 1, further comprising training a transformer neural network used for the refining of the matching point map by using a loss function for the extracted matching point and a labeled matching point between the two images.

10. A non-transitory computer-readable storage medium storing instructions that, when executed by one or more processors, configure the one or more processors to perform the method of claim 1.

11. The method of claim 1, wherein the refining the matching point map through the attention structure is based on the addition between two different layers comprised in the transformer neural network.

12. A processor-implemented method, the method comprising:
   extracting feature maps respectively corresponding to a plurality of channels based on a convolutional network with respect to two training images;
   generating a matching point map from the feature maps;
   refining the matching point map through an attention structure based on addition between layers comprised in a transformer neural network;
   extracting a matching point between the two training images from the refined matching point map; and
   training the transformer neural network for refining the matching point map by using a loss function for the extracted matching point and a labeled matching point between the two training images.

13. The method of claim 12, wherein the refining the matching point map through the attention structure based on the addition between the layers comprised in the transformer neural network comprises:
   determining a first global vector of one dimension from a query layer;
   determining a first relation layer for all key vectors of a key layer by performing addition-based attention on the first global vector and all the key vectors of the key layer;

determining a second global vector of one dimension from an intermediate layer; and determining a second relation layer for all value vectors of a value layer by performing addition-based attention on the second global vector and all the value vectors of the value layer.

14. The method of claim 13, further comprising performing addition of all query vectors of the query layer and all vectors of the second relation layer.

15. The method of claim 12, wherein the generating the matching point map from the feature maps comprises generating the matching point map of four dimension for the feature maps by using the feature maps of two dimension.

16. The method of claim 12, wherein the refining the matching point map by using the attention between the matching points comprised in the matching point map further comprises:

converting the matching point map to a vector of one dimension; and calculating a similarity by performing attention on the matching points.

17. The method of claim 12, wherein the refining the matching point map through the attention structure is based on the addition between two different layers comprised in the transformer neural network.

18. An apparatus comprising:

one or more processors configured to:

extract feature maps respectively corresponding to a plurality of channels based on a convolutional network with respect to the two training images;

generate a matching point map from the feature maps;

refine the matching point map by using attention between matching points comprised in the matching point map through an attention structure based on addition between layers comprised in a transformer neural network; and extract the matching point between the two images from the refined matching point map.

19. The apparatus of claim 18, wherein, for the refining the matching point map through the attention structure based on the addition between the layers comprised in the transformer neural network, the one or more processors are configured to:

determine a first global vector of one dimension from a query layer;

determine a first relation layer for all key vectors of a key layer by performing addition-based attention on the first global vector and all the key vectors of the key layer;

determine a second global vector of one dimension from an intermediate layer; and determine a second relation layer for all value vectors of a value layer by performing addition-based attention on the second global vector and all the value vectors of the value layer.

20. The apparatus of claim 19, wherein the one or more processors are configured to perform addition of all query vectors of the query layer and all vectors of the second relation layer.

21. The apparatus of claim 18, wherein, for the generating the matching point map, the one or more processors are configured to generate the matching point map of four dimension for the feature maps by using the feature maps of two dimension.

22. The apparatus of claim 18, wherein, for the refining the matching point map, the one or more processors are configured to:

convert the matching point map to a vector of one dimension; and calculate a similarity by performing attention on the matching points.

23. The apparatus of claim 18, wherein, for the refining the matching point map, the one or more processors are configured to increase a size of the refined matching point map by upsampling the refined matching point map.

24. The apparatus of claim 18, wherein, for the extracting the feature maps, the one or more processors are configured to extract the feature maps corresponding to a result of a bottleneck layer of the convolutional network.

25. The apparatus of claim 18, wherein, for the extracting the matching point, the one or more processors are configured to extract the matching point between the two images by calculating a dense flow field by using the refined matching point map.

* * * * *